June 27, 1967     A. F. KRUMHOLZ, SR     3,327,953
SEALING MEANS FOR ROTARY AGITATOR OF A GRINDING
AND DISPERSING MILL
Filed Sept. 9, 1964
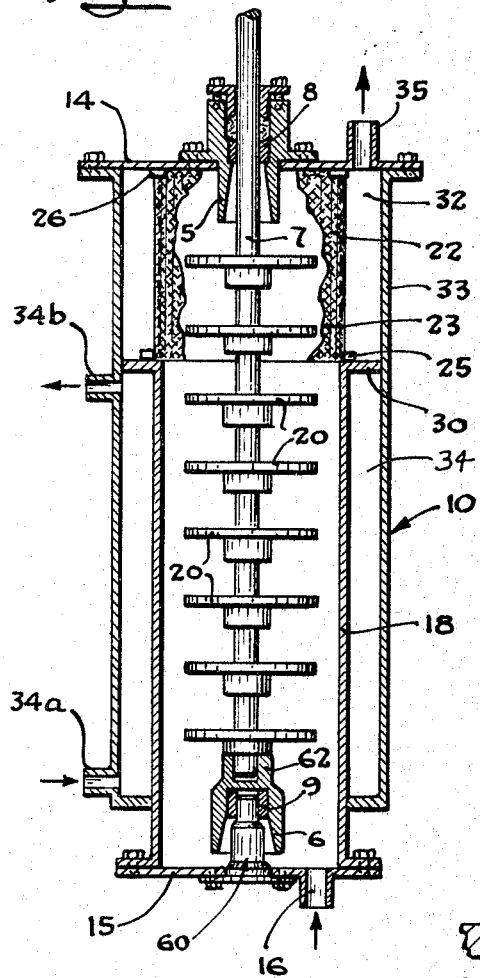
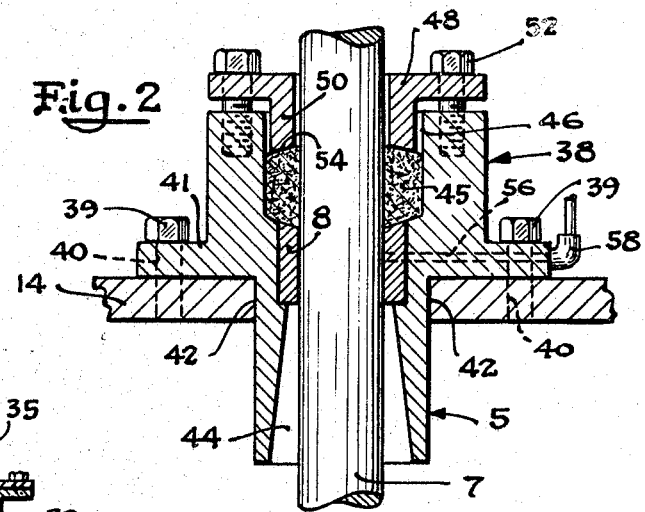
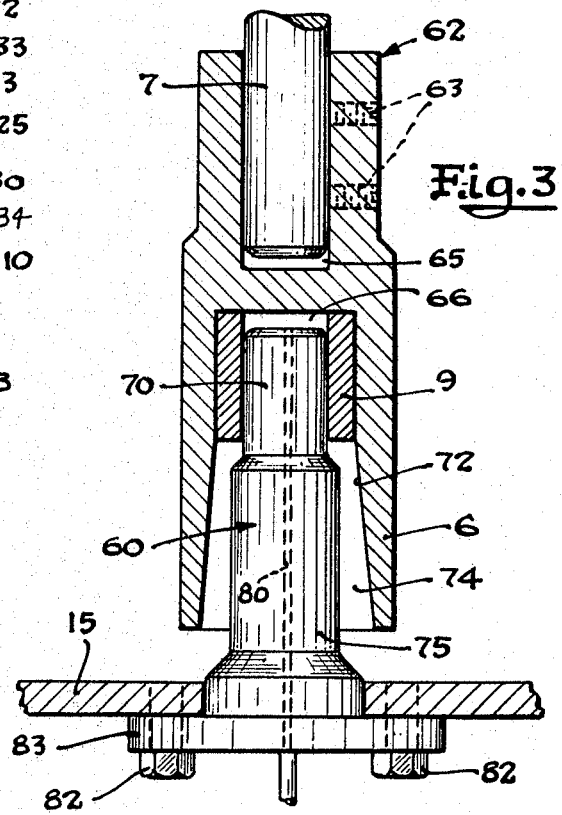
Inventor
Alfred F. Krumholz, Sr.
By Wallace, Kinzer and Dorn
Attorneys

United States Patent Office 3,327,953
Patented June 27, 1967

3,327,953
SEALING MEANS FOR ROTARY AGITATOR OF A GRINDING AND DISPERSING MILL
Alfred F. Krumholz, Sr., Glenview, Ill., assignor to Chicago Boiler Company, Chicago, Ill., a corporation of Illinois
Filed Sept. 9, 1964, Ser. No. 395,166
8 Claims. (Cl. 241—98)

This invention relates to a manner of protecting shaft seals or bearings for a rotatable shaft, and more particularly to protecting shaft seals or bearings for a shaft disposed for rotation in a fluid-containing vessel.

The present invention is directed to the problem of protecting shaft bearings or seals for rotatable shafts against deterioration and attack by either a fluid or particles in the fluid in which the shaft rotates. While conventional mechanical shaft seals prove adequate in many instances to prevent movement of fluid along a rotatable shaft into a bearing and/or to prevent leakage of the fluid from an otherwise enclosed vessel, some fluids contain such abrasive material that the abrasive material wears away or scores the shaft and its seals and results in leaks of the abrasive-carrying fluid past the shaft seals.

For many operations, sealed bearings are relatively expensive and the quality of sealing for the bearing is insufficient to enable long and continuous operation because of the penetration and deterioration of the seal by the fluid and/or abrasive material in which the shaft rotates. Accordingly, an object of the present invention is to protect shaft seals, bearings or the like by forming a layer of compressed air in a chamber about a shaft in such a manner as to inhibit movement of the fluid along the shaft in the direction of a bearing or shaft seal.

Another object of the invention is to form a hollow chamber about a cylindrical shaft disposed within a fluid and to trap air in the chamber, which air is compressed by the fluid to afford an air seal or barrier to prevent movement of the liquid farther along the shaft.

Under a more specific object of the invention, an outer cylindrical housing is spaced about and from a vertical shaft to afford an annular air space therebetween and in which air is trapped and compressed to form an effective seal against the fluid attempting to move further upwardly in the annular space.

The present invention is particularly adapted for employment in a sand grinding process wherein sand or other grinding media and a slurry mixture of pigment and a film former are agitated together so as to disperse and deagglomerate the pigment. Impellers are fixed to a rotating shaft and are disposed within a sealed vessel to agitate the sand and slurry mixture. In some instances, the slurries are fed under pressure, greater than atmospheric, into the enclosed vessel. Particularly where the sand and slurry mixture is forced into the vessel under pressure, the problem of providing an adequate seal about the shaft and its bearings is acute, because of the abrasive nature of the sand and/or pigment and its scoring of the rotatable shaft and conventional type shaft seals. Accordingly, a further object of the invention is a new and improved manner of sealing a shaft carrying the grinding impellers of a sand grinding mill by forming protective air seals about the rotating shaft at the location of the bearings for the shaft.

More specifically, another object of the invention is forming an upper air chamber in a bell shaped housing about an upper bearing for the shaft of the sand grinder and the forming of a lower air chamber in a bell shaped housing within a coupling fastened to the lower end of the rotatable shaft, a barrier layer of compressed air being formed within the coupling and about a stub shaft to protect the lower bearing disposed between the coupling and the stub shaft.

A further object of the invention is a new and improved air seal for a shaft including a bell shaped or cylinder-like member disposed about a shaft to receive and hold compressed air to form an air barrier about a circumference of the shaft, the compressed air being maintained by a supplementary supply of air received under pressure from an outside source of air.

Other and further objects of the invention will be apparent from the following description and claims and are illustrated in the accompanying drawing which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a sectional view of a typical sand grinding apparatus embodying the preferred embodiment invention;

FIG. 2 is an enlarged sectional view of the upper portion of the shaft shown in FIG. 1 and having a bearing protected in accordance with the preferred embodiment of the invention; and FIG. 3 is an enlarged view of the lower end of the shaft having a bearing protected in accordance with the preferred embodiment of the invention.

The present invention is applicable to many types of apparatus having a rotatable shaft disposed within a fluid containing vessel; but the present invention is of particular utility in those types of apparatus such as a sand grinding mill wherein the fluid contains highly abrasive materials as well as solvents which would materially and adversely effect mechanical rotary seals, mechanical face or radial seals of the conventional kind. Seals of this kind have mechanical elements with engaging surfaces which are movable relative to one another or to a rotatable shaft and hence are subject to becoming scored by the abrasive material.

For purposes of illustration only, the present invention is shown employed in a sand grinding apparatus wherein a charge of slurry containing pigment and a film-forming vehicle is forced under pressure through an inlet pipe 16 into the lower, cylindrically walled portion 18 of the sand grinding apparatus. The pigment and film-forming vehicle entering the inlet pipe 16 is preferably pre-mixed into a fluid, roughly homogeneous mixture for further grinding by a sand grinding media disposed within the interior of this cylindrically walled portion 18.

The sand and slurry mixture is agitated within the sand grinding apparatus 10 by a series of suitable shaft impellers 20 each secured to a rotatable shaft 7 in spaced relationship along said shaft 7. The shaft 7 is adapted to be rotated by a suitable power source (not shown) and as the impellers 20 rotate the pigment is ground and dispersed in the film-forming vehicle. As the slurry is ground, it moves upwardly into an interior chamber 22 formed within the interior of a screening member 23. The screening member is formed of a fine mesh screen for separating the sand from the slurry.

The screening member 23 is preferably cylindrical in shape and has a retaining ring 25 disposed against a flange 30 formed on the top of the cylinder 18. The screened member 23 has at its upper end a sealing ring 26 disposed against the top plate 14. The screened member 23 is retained rigidly between the top plate 14 and flange 30 to prevent the media from passing into the annular space 32 except through the screen member 23. The cylinder 18 and screened member 23 constitute an enclosed cylindrical chamber for the sand and slurry extending between the top plate 14 and the bottom plate 15.

The pigment is being more finely ground and more widely dispersed as it is moved upwardly by the series of impellers 20. The sand is separated from the slurry by the screened member 23 so that the now-milled product enters into an annular space 32 between the screened member 23 and an outer cylindrical wall 33 and exists from the annular space 32 through an outlet pipe 35.

For the purpose of cooling the sand and slurry mixture while it is being agitated, a cooling medium such as water is circulated in the annular space between the inner cylinder 18 and the outer cylindrical wall 33. Water is circulated from an inlet pipe 34a and through the annular space 34 and exits out through an outlet pipe 34b. During the start of the operations, the incoming slurry gradually rises to completely fill the lower cylinder 18 and rises upwardly to compress air within the hollow interiors of respective cylindrical shaped members 5 and 6.

The air, which was in the respective hollow interiors of the cylindrical members 5 and 6, is compressed by the rising fluid therein to form an annular barrier layer of compressed air which prevents further upward movement of the sand and slurry mixture into contact with either of the respective shaft bearings 8 and 9. The annular air layer will continue to seal the annular space 44 between the shaft 7 and cylindrical member 5 even though the shaft 7 is abraded or scored and reduced in size with wear. Stated differently, the air layer maintains an intimate sealing contact with the periphery of the shaft 7 even though there are irregularities in the surface of the shaft.

Referring more specifically to FIG. 2, it will be seen that the cylindrically shaped member 5 is formed on the lower portion of a housing 38. The housing 38 is secured to the top plate 14 by suitable threaded fasteners 39 inserted through openings 40 in an annular flange 41 on the housing 38. With the threaded fasteners 39 tightened, the sand and slurry mixture is prevented from exiting through the interface 42 between the outer surface of the cylindrical member 5 and the circular opening in the top plate 14 therefor.

The interior wall of the cylindrical member 5 is preferably tapered to provide an increasingly smaller diameter of annular air chamber or space 44 to assist in the air being compressed to a greater and greater extent as the sand and slurry mixture rises within the cylindrical shaped member 5. For the purpose of preventing loss of air being compressed within the annular chamber 44 by moving upwardly past the bearing 8 and out of the housing 38, a rotary shaft seal in the form of gland type packing 45 is disposed in sealing engagement with the shaft 7 within an upper cylindrical opening 46 within the housing 38.

For the purpose of holding the packing 45 in tight compression about the rotating shaft 7 and thereby preventing the exhausting of the compressed air upwardly between the shaft 7 and the packing 45, a gland member 48 is brought to bear on the packing 45. The gland member 48 has a downwardly extending collar portion 50 abutting against the upper surface of the packing 45 so that tightening of the cap screw fasteners 52 into the housing 38 causes the collar to engage and to compress the packing against the peripheral surface of the shaft 7. It should be noted that the lower surface 54 of the collar 50 is formed at an oblique angle to force the packing inwardly against the peripheral surface of the shaft 7 as the collar 50 is moved downwardly. A face or rotary mechanical seal could be employed in lieu of the packing 45 to keep the compressed air from escaping the air chamber 44.

The bearing 8 is illustrated in the embodiment of the invention as a conventional solid bearing of plastic, bronze, Babbitt or impregnated material, but the bearing 8 could just as well be a ball or roller bearing. In any event, it is not necessary to have a more expensive sealed type of bearing, because the compressed air seal immediately below the lower surface of the bearing 8 prevents the contamination of the bearing either by the abrasive components of the sand and slurry mixture or by the solvents and other materials therein.

It is recognized that there might be a loss of air leaking outwardly through the packing 45. To off-set such a loss of compressed air and to prevent upward movement of the sand and slurry mixture to engage the bearing 8, it is proposed to replace the lost air or compensate for the reduction in pressure of the trapped air in the chamber 44 by directing air under suitable pressure through a passage 56 in the housing 38 leading to the bearing 8 and beneath the packing 45. The air passage 56 is shown in fluid communication with a fitting 58 adapted to be connected to a suitable source of air under pressure (not shown). Depending on the application, air is introduced either intermittently as the pressure falls below a predetermined level or continuously into the passageway 56 to maintain the proper pressure in the air barrier at the top of the annular chamber 44, that is, immediately below the bearing 8.

Turning now to a consideration of the lower portion of the shaft 7, as readily evident from FIG. 3, the shaft 7 does not extend through the base plate 15 but terminates short of a stub shaft 60 to which the shaft 7 is coupled for rotation thereabout by a coupling 62. More specifically, the coupling 62 has an opening 65 in the top thereof to receive the lower end of the shaft 7, and the coupling 62 is secured by a pair of spaced set screws 63 to the lower end portion of the shaft 7. The upper opening 65 in the coupling 62 is coaxial with a lower opening 66 in which is disposed the bearing 9 and upper portion 70 of the stub shaft 60.

Preferably the interior walls 72 of the annular member 6 are tapered in an upward direction to provide an annular air space 74 of decreasing diameter so that with the rise of the sand and slurry mixture upwardly within the annular chamber 74, the air trapped therein is being compressed to a greater degree than would be the case if the volume of the annular chamber 74 were not decreasing. Alternatively, of course, the lower cylindrical portion 75 of a stub shaft could be of a tapered configuration and the interior surface of ball 72 of the member 6 could be straight and non-tapered.

While the upper portion of the chamber 66 is not subject to having air leak therethrough, as is the case with the packing 45 for the upper bearing 8, a passageway 80 is, nonetheless, formed through the interior of the stub shaft 60 which air could be forced under pressure to replace air absorbed by the material, or to create a more substantial air barrier than is due solely to trapped air. This is an advantage in forced pressure systems where the slurry is pumped into the vessel under considerable pressure.

The conduit 80 or, alternatively, a similar passageway in the stub shaft can be used for providing lubricant to the bearing 9, as the occasion demands. The bearing 9 is shown as a solid type bearing formed from materials plastic, such as a Babbitt bronze or sintered metals, but is to be understood that the bearing 9 could be one of a number of other conventional type bearings such as a ball or roller bearing.

Preferably the stub shaft 60 is secured by cap screw fasteners 82 inserted through a flange 83 and threaded into the base plate 15 to seal the flange 83 in fluid-tight engagement with the base plate 15. As will be readily apparent, the stub shaft 60 can be readily removed downwardly through the opening in the base plate should repair or replacement of the bearing 9 be needed.

From the foregoing, it will be seen that the present invention employs an air chamber of compressed air to prevent movement of the fluid outwardly along a driving shaft into a shaft seal or shaft bearing. Preferably the air chamber is formed by cylindrical or bell-shaped members disposed vertically to trap air rising under the pressure of fluid within the vessel to form an air barrier or seal to prevent movement of the liquid therepast. Thus, and as shown particularly in FIGS. 2 and 3, each bearing means 8 and 9 is effectively sealed against liquids or solids by having resort to an annular member as 5 or 6 arranged coaxially with and concentrically around the respective bearing means and including a depending skirt or sleeve-like annular wall as 72 spaced substantially from the related shaft as 7 or 60. Resultantly, the interior wall of the sleeve or skirt defines a completely open air space with the opposed exterior wall of the shaft, and this air space represents a trap for air which will rise in the direction of the related bearing to form a pocket of compressed air acting as a seal between the liquid in the vessel and the bearing means. Preferably the air space or chamber as 44 and 74 is tapered with the wide part thereof at the bottom of the air chamber or space.

The present invention also contemplates reinforcing and supplementing the air compressed within the air chamber by providing an air passageway connected to a suitable source of air under pressure.

Hence, while preferred embodiments of the invention have been described and illustrated, it is to be understood that these are capable of variation and modification.

I claim:

1. In an apparatus for deagglomerating and dispersing particulate solids in liquids by the grinding action of a grinding media on the solids; a mixing vessel for receving the liquid, grinding media and particulate solids; a rotatable shaft extending into said mixing vessel through an opening in said vessel means, said shaft adapted to be rotated within said mixing vessel; impeller means secured to said shaft and rotatable with said shaft to agitate the grinding media to deagglomerate and disperse the particulate solids in the liquid; and sealing means about said shaft and at the opening for said shaft in said vessel to seal said opening against movement of the liquid out through said opening; said sealing means including an annular sleeve of substantially larger diameter than and disposed about the shaft at said opening and spaced concentrically from the shaft to form an air pocket about the shaft adjacent the opening to serve as a barrier for liquid attempting to pass through said opening.

2. In an apparatus for deagglomerating and dispersing particulate solids in liquids by the grinding action of a grinding media on the solids; a mixing vessel means for receiving the liquid, grinding media and particulate solids; a rotatable shaft extending into said mixing vessel means through an opening in said vessel means, said shaft adapted to be rotated within said mixing vessel means; impeller means secured to said shaft and rotatable with said shaft to agitate the grinding media to deagglomerate and disperse the particulate solids in the liquid; and sealing means disposed about said shaft and adjacent the opening for said shaft in said vessel means to seal said opening against movement of the liquid out through said opening; said sealing means including an annular member disposed concentrically about the shaft and in substantial spaced relation thereto adjacent said opening to have said fluid rise in the annular space between said shaft and annular member and compress the air inside said annular space to form an air seal about the shaft to seal the liquid from passing through said opening and from said mixing vessel means.

3. In an apparatus for deagglomerating and dispersing particulate solids in liquids by the grinding action of a grinding media on the solids; a mixing vessel means for receiving the liquid, grinding media and particulate solids; a rotatable shaft in said mixing vessel, said shaft adapted to be rotated within said mixing vessel means; impeller means secured to said shaft and rotatable with said shaft to agitate the grinding media to deagglomerate and disperse the particulate solids in the liquid; a stub shaft secured to a wall of said vessel and aligned with said rotatable shaft; a coupling means between said rotatable shaft and said stub shaft and including a bearing means for said rotatable shaft; and sealing means for said bearing means to seal said bearing means against entry of the fluid into said bearing, said sealing means including an annular sleeve-like member connected to said rotatable shaft in depending coaxial relation thereto and including an annular wall of substantially larger diameter than and in concentric surrounding relation to said stub shaft to present a completely open air space between the exterior of said stub shaft and the interior of said wall immersible in said fluid to trap air compressed therein by said fluid to prevent the fluid from moving into said bearing means.

4. The apparatus of claim 1 wherein said air spaces taper with the wider portion thereof opening toward the bottom of said stub shaft, and a lubricating conduit extending through said stub shaft to said bearing.

5. In an apparatus for deagglomerating and dispersing particulate solids in liquids by the grinding action of a grinding media on the solids; a generally upright mixing vessel means for receiving the liquid, grinding media and particulate solids; a rotatable shaft arranged vertically within said mixing vessel means through an upper opening in said vessel means, said shaft adapted to be rotated within said mixing vessel means; impeller means secured to said shaft and rotatable with said shaft to agitate the grinding media to deagglomerate and disperse the particulate solids in the liquid; an upper bearing means and an upper sealing means for said shaft at said opening to seal said liquid against moving through said opening in said mixing vessel; a first annular member surrounding said upper bearing means and including a sleeve-like portion extending downwardly from said opening in concentric spaced relation to said shaft to define with said shaft a downwardly opening air space in which air will be trapped and compressed to prevent liquid from contacting said upper bearing means; a stationary shaft means projecting upwardly from the bottom of said mixing vessel means, a coupling means secured to said rotatable shaft at its lower end, a lower bearing means disposed in said coupling and about said stationary shaft means, and a second annular member extending downwardly from said coupling and including an annular wall spaced from and concentrically about said stationary shaft to form an annular air space in communication with said bearing means, said annular air space opening adjacent the bottom of said stationary shaft thereby affording a trap for air to seal said bearing against liquid rising along said stationary shaft and into said bearing means.

6. Apparatus according to claim 5 in which said annular air space is tapered with the wide portion thereof opening adjacent the bottom of said stationary shaft.

7. In an apparatus of deagglomerating and dispersing particulate solids in liquids by the grinding action of a grinding media on the solids; a mixing vessel means adapted to be disposed in a generally upright position for receiving the liquid, grinding media and particulate solids; a rotatable shaft arranged vertically within said mixing vessel means, said shaft adapted to be rotated within said mixing vessel means; impeller means secured to said shaft and rotatable with said shaft to agitate the grinding media to deagglomerate and disperse the particulate solids in the liquid; an upper bearing means and a lower bearing means for said shaft each disposed about said shaft; a pair of sealing means adapted to seal said liquid from each of said bearing means, each of said sealing means including an annular sleeve-like member disposed concentrically about the shaft, a portion of each such annular members surrounding and being spaced from said shaft to form a downwardly opening annular air space for receiving compressed air rising upward along said shaft to seal said liquid from rising to each of said bearing means.

8. Apparatus according to claim 7 wherein each of said annular air spaces is also tapered with the wide part at the bottom thereof.

(References on following page)

References Cited

UNITED STATES PATENTS

| | | | |
|---|---|---|---|
| 2,486,939 | 11/1949 | Freund | 277—71 |
| 2,601,731 | 7/1952 | Trede | 308—36.3 |
| 2,719,011 | 9/1955 | Bebinger | 241—46 |
| 2,981,490 | 4/1961 | Conley | 277—77 X |
| 3,215,353 | 11/1965 | Goeser | 241—74 X |
| 3,243,128 | 3/1966 | Tight | 241—172 X |

WILLIAM W. DYER, Jr., *Primary Examiner.*

HARRY F. PEPPER, Jr., *Examiner.*